United States Patent
Jaynes et al.

(10) Patent No.: US 10,579,163 B2
(45) Date of Patent: Mar. 3, 2020

(54) SYSTEM AND METHOD OF ANNOTATION OF A SHARED DISPLAY USING A MOBILE DEVICE

(71) Applicant: Mersive Technologies, Inc., Denver, CO (US)

(72) Inventors: Christopher O. Jaynes, Denver, CO (US); Robert Balgley, Denver, CO (US); Michael Tolliver, Denver, CO (US); Joshua Schrader, Westminster, CO (US); Colleen Yerkes, Denver, CO (US); Marcus William Robert Birney, Centennial, CO (US); Vincent Keller, Denver, CO (US); Vincent Ferreri, Frederick, CO (US); Brandon Barron, Denver, CO (US)

(73) Assignee: Mersive Technologies, Inc., Denver, CO (US)

( * ) Notice: Subject to any disclaimer, the term of this patent is extended or adjusted under 35 U.S.C. 154(b) by 0 days.

(21) Appl. No.: 15/996,455

(22) Filed: Jun. 2, 2018

(65) Prior Publication Data

US 2019/0369747 A1 Dec. 5, 2019

(51) Int. Cl.
*G06F 3/0346* (2013.01)
*H04W 4/02* (2018.01)

(52) U.S. Cl.
CPC .......... *G06F 3/0346* (2013.01); *H04W 4/027* (2013.01)

(58) Field of Classification Search
CPC ............... G06F 3/0346; G06F 3/04883; G06F 2203/0384; G06Q 30/02; G06Q 30/06; G08C 17/02; H04L 67/04; H04L 63/107; H04L 63/0846; H04L 63/18; H04L 67/02; H04L 67/025; H04W 4/80; H04W 12/06; H04N 21/41415; H04N 21/4222
See application file for complete search history.

(56) References Cited

U.S. PATENT DOCUMENTS

| | | |
|---|---|---|
| 7,941,828 B2 | 5/2011 | Jauer |
| 2004/0075671 A1 | 4/2004 | Vale et al. |
| 2006/0026502 A1 | 2/2006 | Dutta |
| 2006/0031779 A1 | 2/2006 | Theurer et al. |
| 2008/0034038 A1 | 2/2008 | Ciudad et al. |
| 2008/0048975 A1 | 2/2008 | Leibow |
| 2008/0255461 A1 | 10/2008 | Weersink |
| 2009/0217177 A1 | 8/2009 | Degrazia |

(Continued)

OTHER PUBLICATIONS

European Search Report in European Patent Application No. 14756426.4 dated Aug. 26, 2016, 7 pages.

(Continued)

*Primary Examiner* — Nelson M Rosario
(74) *Attorney, Agent, or Firm* — Lathrop GPM LLP

(57) ABSTRACT

Systems and methods use a mobile device to position an annotation of displayed content on a shared display coupled with a host device. Sensor data, such as gyroscope and accelerometer data, from the mobile device may be transmitted to the host device and used to generate the annotation. The sensor data may be preprocessed to smooth and fit the data to a parametric curve or shape prior to or after display on the shared display. The user of the mobile device may interact with the mobile device to further start and stop the annotation, as well as denote to animate the annotation.

20 Claims, 9 Drawing Sheets

(56) References Cited

U.S. PATENT DOCUMENTS

| | | |
|---|---|---|
| 2009/0235170 A1 | 9/2009 | Golden et al. |
| 2010/0169791 A1 | 7/2010 | Pering et al. |
| 2010/0199191 A1 | 8/2010 | Yusuke |
| 2011/0081920 A1 | 4/2011 | Hung et al. |
| 2011/0230134 A1 | 9/2011 | Ortiz et al. |
| 2011/0241985 A1 | 10/2011 | Hill et al. |
| 2012/0054640 A1 | 3/2012 | Nancke-Krogh |
| 2012/0133727 A1 | 5/2012 | Bolduc et al. |
| 2012/0173622 A1 | 7/2012 | Toledano et al. |
| 2012/0314018 A1 | 12/2012 | Wengrovitz et al. |
| 2013/0143651 A1* | 6/2013 | Harrison ............... H04L 63/107 463/31 |
| 2013/0311867 A1 | 11/2013 | Patterson et al. |
| 2013/0328662 A1* | 12/2013 | Kang ..................... G08C 17/02 340/5.61 |
| 2014/0063174 A1 | 3/2014 | Junuzovic et al. |
| 2014/0115502 A1 | 4/2014 | Van Wie et al. |
| 2014/0229542 A1 | 8/2014 | Yu et al. |
| 2014/0240445 A1 | 8/2014 | Jaynes |
| 2014/0267577 A1 | 9/2014 | Weber et al. |
| 2015/0020122 A1 | 1/2015 | Shin et al. |
| 2015/0201193 A1 | 7/2015 | Gu et al. |
| 2019/0034076 A1* | 1/2019 | Vinayak ................. G06F 3/017 |

OTHER PUBLICATIONS

International Search Report and Written Opinion corresponding to International Patent Application No. PCT/US2016/044581, dated Oct. 20, 2016, 7 pages.

International Search Report and Written Opinion of the International Searching Authority dated Aug. 27, 2014, for corresponding International Patent Application No. PCT/US2014/018526, 18 pages.

Chinese Patent Application No. 201480010455.X 201480010455, English translation of Office Action dated Mar. 29, 2018, 2 pp.

International Search Report and Written Opinion of PCT/US2019/035095 dated Aug. 19, 2019, 9 pp.

Carter et al. (2004) "Digital graffiti: public annotation of multimedia content." CHI 2004, Apr. 24-29, 2004, Vienna, Austria, 4 pp.

* cited by examiner

SYSTEM AND METHOD OF ANNOTATION OF A SHARED DISPLAY USING A MOBILE DEVICE

BACKGROUND

Traditional annotation and white boarding systems have been designed for a single-user presentation case where the presenting user stands at the front of the room and interacts with the display directly to mark-up and draw on the display itself. Other annotation systems allow a user, using a digital pen or even the user's fingers on a touch display, to touch and draw on the digital display surface over the top of existing content. The user's touch points directly denote the point on the display where a corresponding drawing event should occur. For example, when a user touches point $(x,y)_1$ and drags her/his finger to point $(x,y)_2$ the annotation system may draw a line between those two pixel locations on the display. This technique has been extended to support multiple users who are interacting with the display simultaneously.

Alternatives to this model have been introduced by allowing users to interact with a simulated display on their own device. Users can then remain in place to draw on a local display and then those annotations are translated to the display in the room for group viewing.

SUMMARY OF THE EMBODIMENTS

The following summary is intended to provide some aspects of the embodiments disclosed herein. Features within embodiments of the aspects, as well as other aspects in this summary, and as well as features disclosed but not listed in a given aspect in this summary may be combined in any manner desired, as would be understood by a person of ordinary skill in the art. As such, the following summary is not limiting in scope, but is listed for example purposes.

In a first aspect, system for annotation of shared display, comprises a mobile device having a processor, a position sensor, and client annotation instructions that, when executed by the processor operate to: register the mobile device to a host device connected with a shared display, in response to a start indication generated via user interaction with the mobile device, position annotation of displayed content on the shared display using sensor data captured from the position sensor of the mobile device.

In an embodiment of the first aspect, the position sensors include a gyroscope and accelerometer of the mobile device.

In an embodiment of the first aspect, the client annotation software is further configured to transmit shared content from the mobile device to the host device, and the annotation is an annotation over the shared content.

In an embodiment of the first aspect, the register the mobile device to a host device includes: interacting with a user, via an input device of the mobile device, to receive a registration input; transmitting the registration input to the host device; and, establishing a connection between the host device and the mobile device if the registration input matches a host ID.

In an embodiment of the first aspect, the host ID is displayed on the shared display.

In an embodiment of the first aspect, the position annotation of displayed content includes: monitor the sensor data at a plurality of time measurements; and generate a series of (x,y) screen coordinates defining intended motion of the annotation on the shared display.

In an embodiment of the first aspect, the position annotation of displayed content includes: monitoring the sensor data at a plurality of time measurements; generating tilt, yaw, and roll information based on the sensor data; and, transmitting the tilt, yaw, and roll information as a client annotation output to the host device.

T In an embodiment of the first aspect, the monitor sensor data further includes generating translation information between at least two of the plurality of time measurements, and further outputting the translation information as the client annotation output.

In an embodiment of the first aspect, the client annotation instructions further operating to receive client input data and outputting the client annotation output based on the client input data.

In an embodiment of the first aspect, the client input data includes one or more of color, size, shape, and text of an annotation to be displayed on a shared display coupled with the host device.

In an embodiment of the first aspect, the client input data includes an animate indication received at the mobile device indicating to animate the annotation on the shared display.

In an embodiment of the first aspect, the start indication includes a button press by the user on the input device.

In an embodiment of the first aspect, the start indication includes detection of a mobile-device-pickup action by the user detected via accelerometer data.

In an embodiment of the first aspect, the client annotation instructions further operating to receive a stop indication, and end the position the annotation in response to the start indication.

In an embodiment of the first aspect, the stop indication includes a button press by the user on the input device.

In an embodiment of the first aspect, the stop indication includes detection of a phone putdown action by the user via the accelerometer data.

In an embodiment of the first aspect, the position the annotation includes: monitoring the sensor data at a plurality of time measurements; identifying a plurality of control joints of an intended annotation based on the sensor data; fitting a parameterized function to the plurality of control joints to determine a parameterized curve; and, transmitting the parameterized curve to the host device as a client annotation output.

In an embodiment of the first aspect, the parameterized curve is a polynomial curve or a spline curve.

In an embodiment of the first aspect, the position the annotation further comprises: during the fitting a parameterized function, fitting a shape to the plurality of control joints or the parameterized curve, and transmitting the shape to the host device instead of the parameterized curve when the shape fits within a predefined fit-threshold.

In an embodiment of the first aspect, the client annotation instructions generating a client annotation output indicating to reset the annotation on the shared display when the sensor data exceeds a sensor threshold.

In a second aspect, a system for annotation of a shared display, comprises: a host device coupled with the shared display and including a processor and memory storing a host annotation instructions that when executed by the processor operate to: transmit a host ID to the shared display for display thereon, transmit displayed content to the shared display for display thereon, wirelessly connect the host device with a mobile device in response to determination that a registration input, received from the client device, matches the host ID, in response to receipt of a start indication generated via user interaction with the mobile device, position a displayed content annotation based on received client annotation output from the mobile device, the client annotation output being based on sensor data from position sensors of the mobile device.

In an embodiment of the second aspect, the position sensors include a gyroscope and accelerometer of the mobile device.

In an embodiment of the second aspect, the host annotation software is further configured to receive shared content from the mobile device, the annotation being an annotation over the shared content.

In an embodiment of the second aspect, the position the displayed content annotation includes initiate the annotation on the shared display at a preset annotation initial start point.

In an embodiment of the second aspect, the position the annotation including resetting the annotation to the initial start point when the client annotation output reflects that the sensor data has exceeded a sensor threshold.

In an embodiment of the second aspect, the annotation initial start point is a center of the shared display.

In an embodiment of the second aspect, the displayed content annotation includes annotation content to be superimposed on the displayed content, and a client ID defining a user of the mobile device.

In an embodiment of the second aspect, the position the displayed content annotation includes rendering the annotation on the edge of the shared display when the client annotation output indicates to move the displayed content annotation off-screen.

In an embodiment of the second aspect, the position the displayed content annotation includes animating the displayed content annotation when the client annotation output includes an animate indication.

In an embodiment of the second aspect, the position the displayed content annotation includes modifying the client annotation data based on a predetermined modifier.

In an embodiment of the second aspect, the predetermined modifier is a parameterized curve fit to a plurality of control joints based on the client annotation output.

In an embodiment of the second aspect, the parameterized curve is a polynomial curve or a spline curve.

In an embodiment of the second aspect, the predetermined modifier is a shape fit to a plurality of control joints based on the client annotation output when the control joints fits the shape within a predefined fit threshold, or a parameterized curve or spline fit to the plurality of control joints based on the client annotation output when the control joints does not fit the shape within the predefined fit threshold.

In an embodiment of the second aspect, the position the displayed content annotation includes removing the displayed annotation from the shared display based on a preset annotation timer.

In an embodiment of the second aspect, the preset annotation timer is a clock-based timer.

In an embodiment of the second aspect, the present annotation timer defines a maximum length of the displayed content annotation on the shared display.

In an embodiment of the second aspect, the present annotation timer is based on a speed of the displayed content annotation as defined by a translation included in the client annotation data.

In an embodiment of the second aspect, the host annotation instructions further operate to store annotation history defining prior annotations on the displayed content.

In an embodiment of the second aspect, the host annotation instructions further operate to transmit the annotation history to an external device.

In a third aspect, a method for annotation of a shared display coupled with a host device, comprises: registering a mobile device to the host device; and, in response to a start indication generated via user interaction with the mobile device, positioning annotation of displayed content on the shared display based on a client annotation output transmitted between the mobile device and the host device and including sensor data captured via position sensors at the mobile device and transmitted to the host device.

In an embodiment of the third aspect, the position sensors are a gyroscope and accelerometer.

In an embodiment of the third aspect, the method further comprises transmitting shared content between the mobile device and the host device; the positioning annotation including positioning the annotation over the shared content.

In an embodiment of the third aspect, the register the mobile device with the host device comprises: receive a registration input at the mobile device; transmit the registration input to the host device; compare the registration input to a host ID stored at the host device; and, wirelessly connect the host device and the mobile device when the registration input matches the host ID.

In an embodiment of the third aspect, the client annotation output includes tilt data, yaw data, and roll data generated based on the position sensors.

In an embodiment of the third aspect, the client annotation output includes translation data between two or more control joints defined by each of a time series measurements of the sensor data.

In an embodiment of the third aspect, the client annotation output includes client input data.

In an embodiment of the third aspect, the client input data includes color, size, shape, and text of an annotation to be displayed on a shared display coupled with the host device.

In an embodiment of the third aspect, the client input data includes an animate indication received at the mobile device indicating to animate the annotation on the shared display.

In an embodiment of the third aspect, the positioning annotation further comprises modifying the client annotation output according to a predetermined modifier.

In an embodiment of the third aspect, the predetermined modifier is a shape fit to a plurality of control joints based on the client annotation output when the control joints fits the shape within a predefined fit threshold, or a parameterized curve or spline fit to the plurality of control joints based on the client annotation output when the control joints does not fit the shape within the predefined fit threshold.

In an embodiment of the third aspect, the predetermined modifier is a parameterized curve or a spline fit to a plurality of control joints based on the client annotation output.

In an embodiment of the third aspect, the predetermined modifier is applied at the mobile device.

In an embodiment of the third aspect, the predetermined modifier is applied at the host device.

In an embodiment of the third aspect, the positioning ending in response to a stop indication received at the mobile device.

In an embodiment of the third aspect, the positioning includes continuing to capture the sensor data after a stop indication if a data capture-stop delay has not passed.

In an embodiment of the third aspect, the positioning includes positioning the annotation at an edge of the shared display if the client annotation output indicates to move the annotation off the shared display.

In an embodiment of the third aspect, the position the displayed content annotation includes removing the displayed annotation from the shared display based on a preset annotation timer.

In an embodiment of the third aspect, the preset annotation timer is a clock-based timer.

In an embodiment of the third aspect, the present annotation timer defines a maximum length of the annotation on the shared display.

In an embodiment of the third aspect, the present annotation timer is based on a speed of the annotation as defined by a translation included in the client annotation output.

In an embodiment of the third aspect, the method further comprises storing an annotation history defining prior annotations on the shared display.

In an embodiment of the third aspect, the method further comprises transmitting the annotation history to a device external to the host device.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

DETAILED DESCRIPTION OF THE EMBODIMENTS

Figure 1:
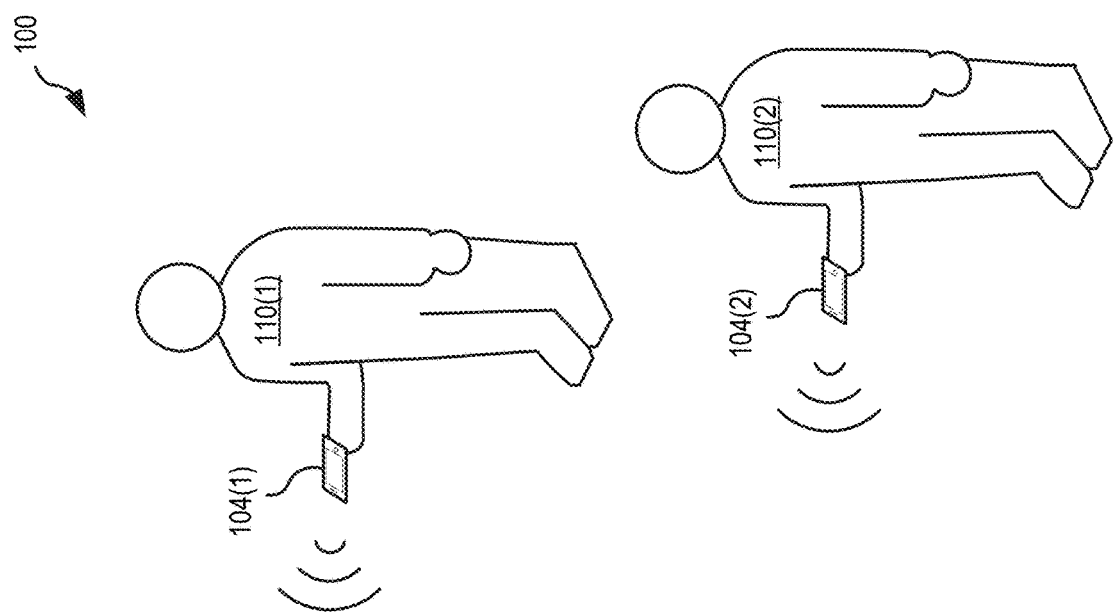
FIG. 1 depicts an exemplary system for annotation of a shared display, in embodiments.
Figure 1:
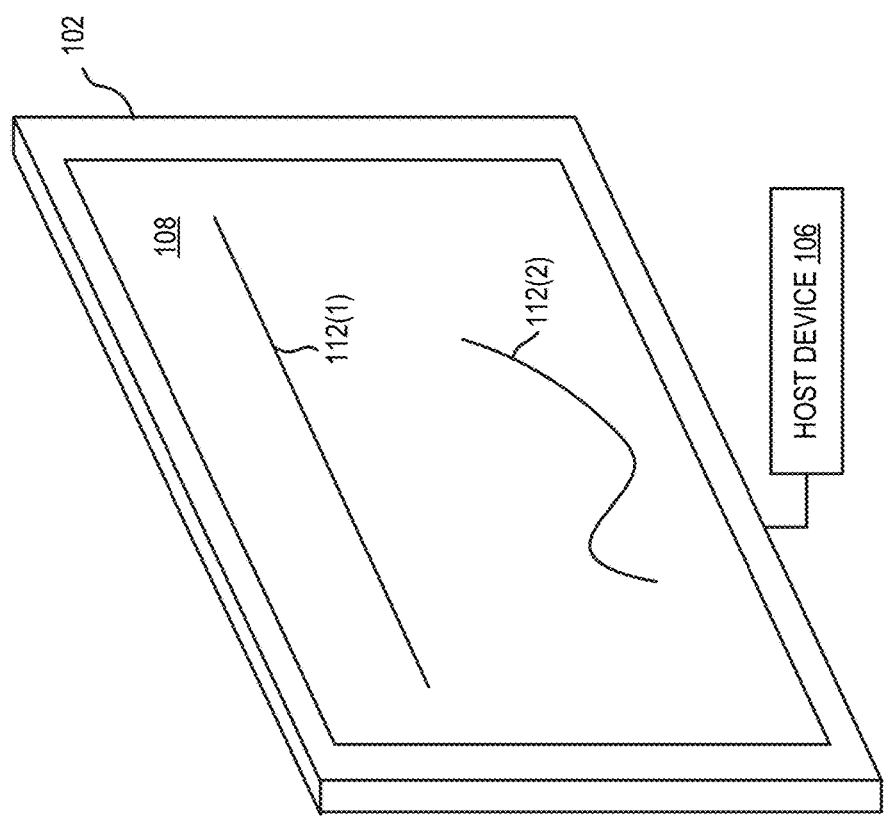

A significant disadvantage of traditional annotation approaches is that users must be within reach of the display in order to annotate over content, create new markups, or draw. This limitation may seem trivial for presentation oriented environments when a presenting user is typically already positioned at the head of the room. However, in collaborative scenarios, where frequent, ad hoc, and on-demand interaction may be needed—this limitation significantly hinders efficient collaboration. Users who are not already within reach of the display are discouraged to interact by the additional disruption, time, and energy it takes to approach the display. Furthermore, this type of interaction can change the collaborative nature of a group when particular users need to "take the stage" in order to interact with the display.

Furthermore, approaches that allow users to interact with a simulated display on their own device also suffer significant disadvantages. First, user devices are typically much smaller than the room display so the corresponding area that can be marked cannot be edited with the same fidelity as the direct-interaction model. For example, consider a display whose pixel resolution is 5 times that of a user's device. If a user wishes to circle a small feature on the display (at size S) it may be difficult to accomplish this by drawing a corresponding circle that, on his device must be 5 times smaller. Furthermore, some of the advantages of the natural and intuitive direct-interaction model described above are lost when users are forced to annotate on a virtual surface on their own device that is then transmitted to the display. For example, it's difficult for collaborators to know who is annotating if each user can simply augment their own device work area to cause an annotation to appear.

The systems and methods described herein solve the above disadvantages by introducing a new approach to digital annotation that supports one or multiple users interacting with a display using a mobile device. These systems and methods, in at least some embodiments, support environments where users are working together with a shared display and have a need to markup and annotate the display in real-time.

For example, a group of users may come together to view a presentation on a shared display from a laptop. Partway through the presentation, one or more users may want to circle a portion of the presentation for emphasis to the audience. At the same time, a member of the audience may want to point at and highlight an area of the slide to highlight an area of the presentation that may be confusing to her/him. The embodiments described herein disclose a new approach that does not require the member of the audience to directly interact with the laptop, and that does not introduce a second virtual display surface on the audience member's (also referred to as "user") devices. Instead, users point their devices at the shared display and, through gestures or other initiating actions, are able to annotate the display. This methodology is more collaborative as users can interact, on-demand from anywhere in the room, scales to large numbers of users, and allows participants to see who is annotating because those users are gesturing in front of the group.

Furthermore, the current systems do not require specialized hardware, such as a device equipped with infrared emitters that are tracked with respect to infrared sensors placed around the room display. Instead, the systems and methods herein take advantage of the ubiquitous nature of mobile devices in society. The systems and methods herein utilize a device that is already owned by a specific user (their mobile device) and that must first connect and identify itself with the shared display. In this way any number of devices can annotate simultaneously and annotation markings can easily be associated with the various users. This also means additional hardware is not needed.

Figure 2:
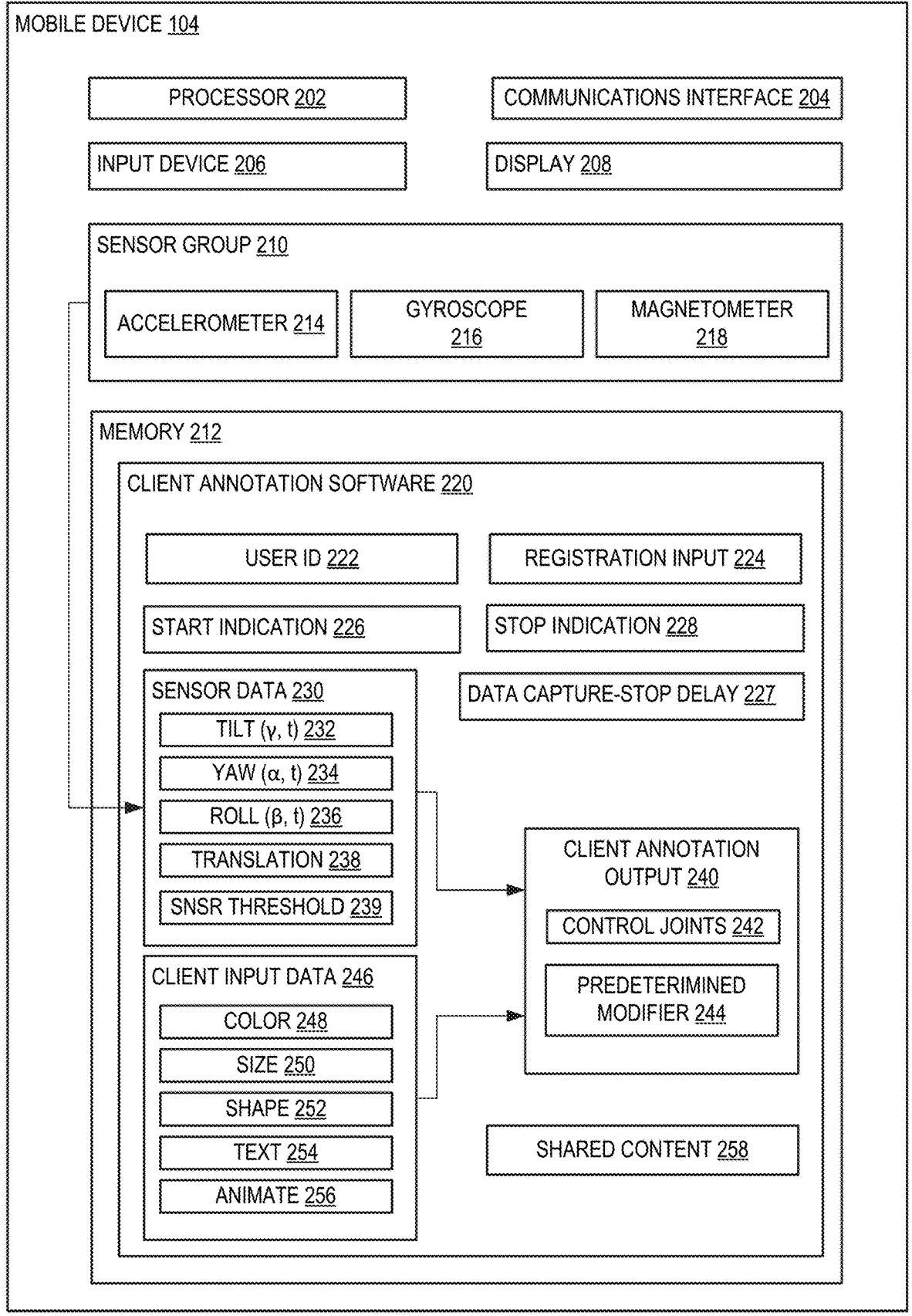
FIG. 2 depicts the mobile device of FIG. 1, in further detail.
Figure 3:
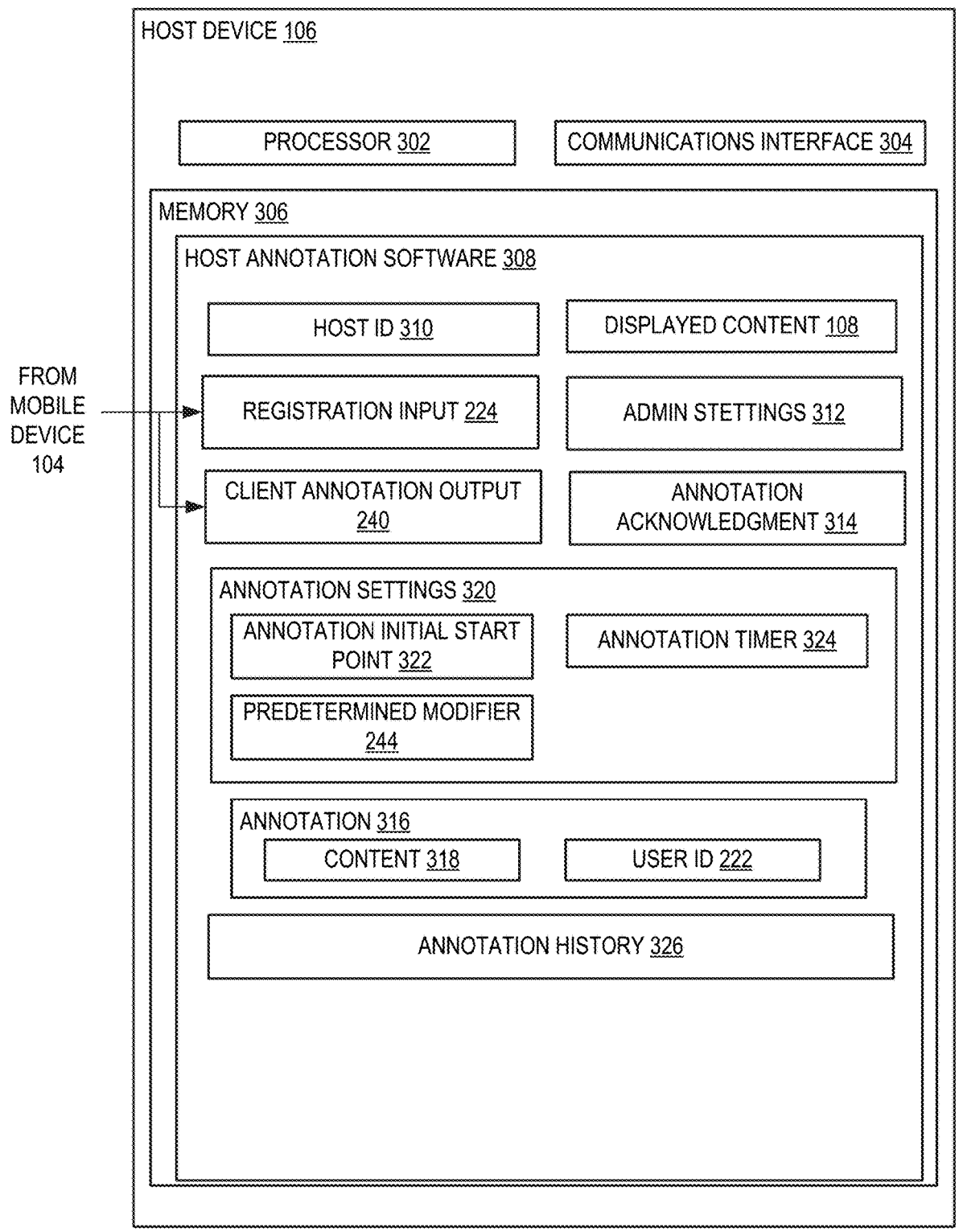
FIG. 3 depicts the host device of FIG. 1, in further detail.

FIG. 1 depicts an exemplary system 100 for annotation of a shared display 102, in embodiments. FIG. 2 depicts a mobile device 104 of FIG. 1, in further detail. FIG. 3 depicts a host device 106 of FIG. 1, in further detail. FIGS. 1-3 are best viewed together with the following description.

The shared display 102 is in wired or wireless communication with the host device 106. The shared display 102 displays content 108. The content 108 may be supplied by the host device 106, or by another device coupled with the shared display, such as a connected computer (laptop, desktop, etc.). A user 110, via the mobile device 104, may register their mobile device 104 with the host device 106, via the process discussed below, and subsequently may position an annotation 112 based on free-form movement of the mobile device 104. In embodiments, the annotation 112 is a virtual dot such that the mobile device 104 acts as a laser pointer with respect to the shared display 102. Other annotations may be used without departing from the scope hereof.

In the embodiment shown in FIG. 1, a first user 110(1) uses his/her mobile device 104(1) to position annotation 112(1) on the shared display 102, and a second user 110(2) uses his/her mobile device 104(2) to position annotation 112(2) on the shared display 102. The annotations 112(1) and 112(2) may have any shape as defined by the respective user 110's movement of their mobile device 104. Any number of mobile devices 104 may be coupled to the host device 106.

As shown in FIG. 2, the mobile device 104 includes a processor 202, a communications interface 204, an input device 206, a display 208, a sensor group 210, and a memory 212. The mobile device 104 may be any one or more of a smartphone, tablet, laptop, etc. In embodiments, the mobile device 104 may be one or more of the client devices described in U.S. Patent Application Publication No. 2014/0240445 A1, entitled "System and Method for Multi-User Control and Media Streaming to a Shared Display", the entirety of which is incorporated by reference herein.

The processor 202 may be a microprocessor or any other device capable of executing computer readable instructions. For example, many smartphones use an ARM processor as the central processing device.

The communications interface 204 may be hardware (such as a wireless data chipset) and associated firmware that implements wireless communication protocol, such as cellular (2G, 3G, 4G, 5G, LTE, Bluetooth, Bluetooth Low Energy, Wi-Fi, etc.).

The input device 206 is any device configured to, or otherwise capable of, interacting with the user 110 to receive inputs into the mobile device 104. In embodiments, the input device 206 is a part of the display 208, such as where the display 208 is a touchscreen.

The sensor group 210 may include position sensors configured to determine the orientation and other position information of the mobile device 104. For example, the sensor group 210 may include one or more of an accelerometer 214, a gyroscope 216, and a magnetometer 218. The accelerometer 214 measures a change in direction of the mobile device 104. The gyroscope 216 measures rotation of the mobile device with respect to itself. The magnetometer 218 measures the magnetic field around the mobile device 104 (e.g., the earth's magnetic field) and may be used to calibrate data from the accelerometer 214 and the gyroscope 216 to determine a true orientation and translation information as the user 110 moves the mobile device 104.

The memory 212 may include one or both of volatile and non-volatile memory. The memory 212 may store client annotation software 220 as transitory and/or non-transitory computer readable instructions that when executed by the processor 202 operate to implement the functionality of the mobile device 104 described herein. The client annotation software 220 may be, for example, an application running on the mobile device that is displayed on display 208 such that the user 110 may initiate annotation on the shared display 102. For example, the client annotation software 220 may be the Solstice Client application by Mersive Technologies, Inc. Accordingly, the client annotation software 220 may include a user ID 222 identifying the user 110 as the owner and/or operator of the mobile device 104.

Now referring to FIG. 3, the host device 106 may be integrated into the shared display 102, or may be separate therefrom and wired or wirelessly connected to the shared display 102. The host device 106, for example, may be the Solstice Pod, by Mersive Technologies, Inc. The host device 106 may include a processor 302, a communications interface 304 and a memory 306. The processor 302 may be a microprocessor or any other device capable of executing computer readable instructions.

The communications interface 204 may be hardware (such as a wireless data chipset) and associated firmware that implements wireless communication protocol, such as cellular (2G, 3G, 4G, 5G, LTE, Bluetooth, Bluetooth Low Energy, Wi-Fi, etc.). The communications interface 204 may also include a wired component, such as a USB, HDMI cable, Lighting cable, or the like for coupling the host device 106 to the shared display 102.

The memory 306 may include one or both of volatile and non-volatile memory. The memory 306 may store host annotation software 308 as transitory and/or non-transitory computer readable instructions that when executed by the processor 302 operate to implement the functionality of the host device 106 described herein. The host annotation software 308, in embodiments, may include the displayed content 108 that is displayed on the shared display 102. In embodiments, the displayed content 108 may be one or more media streams from a client device, such as described in U.S. Patent Application Publication No. 2014/0240445 A1, entitled "System and Method for Multi-User Control and Media Streaming to a Shared Display", the entirety of which is incorporated by reference herein. Accordingly, the mobile device 104 may share content 258 stored its own device as a media stream between the mobile device 104 and host device 106, and then virtually annotate that content on the shared display 102 without annotating the content on the mobile device 104 itself. Furthermore, in embodiments multiple mobile devices 104 may be sharing content, and thus any mobile device 104 may annotate over the shared content from any other mobile device 104, whether or not the annotating mobile device is sharing content or not.

Registration of Mobile Device to Host Device:

The host annotation software 308 may include a host ID 310. The host ID 310 may be an IP address, or some other unique code for identifying the host device 106. The host ID 310 may be displayed on the shared display 102, or may otherwise be informed to the user 110. The user 110, via interaction with input device 206 of the mobile device 104, may input a registration input 224. The registration input 224 may then be transmitted to the host device 106 via communications interface 204 of the mobile device 104 and communications interface 304 of the host device 106. The host annotation software 308 may then compare the host ID 310 to the received registration input 224 and if the host ID 310 matches the received registration input 224, the mobile device 104 is registered to the host device 106. Under such registration, the mobile device 104 may position, or otherwise control, its respective annotation (e.g., annotation 112) on the shared display 102 via interaction with host device 106. It should be appreciated that other methods of registering the mobile device 104 to the host device 106 may be implemented without departing from the scope hereof, such as automatic registration if it is determined that the mobile device 104 is in the same room as the host device 106.

In some embodiments, the registration of the mobile device 104 may be precluded, or otherwise controlled by, one or more administration settings 312 stored on the host device 106. The administration settings 312 may, for example, block all or certain mobile devices 104 from registering to the host device 106. Additionally, or alternatively, the administration settings 312 may allow registration of the mobile device 104 to the host device 106, but block the mobile device 104 from annotating on the shared display 102. The administration settings 312 may define the maximum number of mobile devices 104 that are allowed to register to the host device 106. The administration settings 312 may be transmitted to the host device 106 via an administrator device (not shown). The administrator device may be one of the mobile devices 104, in embodiments.

It should be appreciated that the above described registration may be repeated or otherwise implemented for each mobile device 104 registering to the host device 106.

Annotation Using Mobile Device:

Once registered to the host device 106, the mobile device 104 is able to position an annotation 112 on the shared display 102. The annotation may be started and stopped based on a start indication 226 and a stop indication 228, respectively. The start indication 226 may represent a "pen-up" event and the stop indication 228 may represent a "pen-down" event where the user 112 is using the mobile device 104 as a virtual pen on the shared display 102.

Figure 7A:
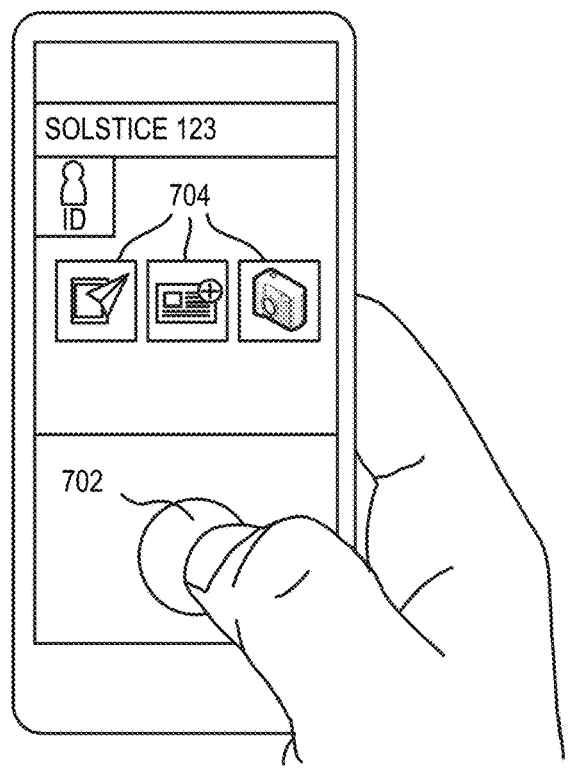
FIGS. 7A and 7B illustrate a "swipe up" of a virtual button on the screen indicating a start indication.
Figure 7B:
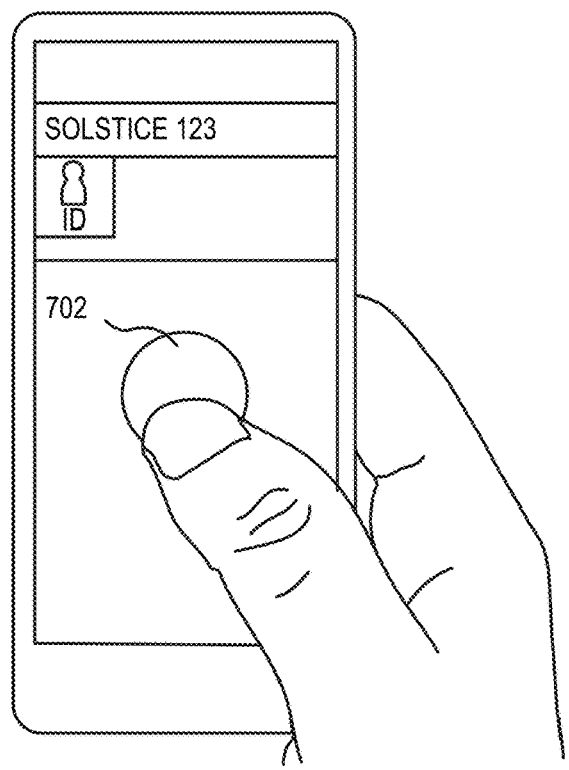

The start indication 226, in embodiments, may be a press of an actual or virtual button on the input device 206, or other action. For example, FIGS. 7A and 7B illustrate a "swipe up" of a virtual button 702 on the screen indicating a start indication 226. The virtual button 702 may be displayed in an application (such as the Solstice client application) including other interactions 704 with the shared display, such as but not limited to: mirror mobile device 104 screen, share media from the mobile device 104, and take an image. In embodiments, the start indication 226 may be a "press-and-hold" indication where the sensor data 230 is only captured if the user 110 is holding down the virtual or actual button on the mobile device 102. In embodiments, the start indication 226 may be determination of a specific gesture performed by the user 110 with the mobile device 104, such as flipping the mobile device 104 from a screen-side down to a screen-side up motion (e.g., a mobile-device-pickup action). The gesture may be detected based on sensor data 230 stored in the memory 212 and generated by one or more of the accelerometer 214, gyroscope 216, and magnetometer 218. Other gestures may be implemented without departing from the scope hereof.

The stop indication 228, in embodiments, may be a press of an actual or virtual button on the input device 206, or a release of the actual or virtual button (e.g., where the start indication 226 is a press-and-hold indication discussed above). The reverse of the action shown from FIGS. 7A-7B may indicate a stop indication 228. In embodiments, the stop indication 228 may be determination of a specific gesture performed by the user 110 with the mobile device 104, such as flipping the mobile device 104 from a screen-side up to a screen-side down motion. The gesture may be detected based on the sensor data 230 stored in the memory 212 and generated by one or more of the accelerometer 214, gyroscope 216, and magnetometer 218. Other gestures may be implemented without departing from the scope hereof.

In embodiments, the client annotation software 220 may further include a data capture-stop delay 227. The data capture-stop delay 227 may be a timer that prevents multiple start indications 226, received prior to a stop indication 228, from interfering from one another. For example, if the user 110 submits two start indications 226 within a short period of time, the annotation 112 position on the shared display 102 is not remapped or otherwise restarted at an initial start-point (e.g., initial start point 322 discussed below) on the shared display 102. The data capture-stop delay 227 may also require the client annotation software 220 to continue to capture sensor data 230 after receipt of a stop indication 228. For example, if the user 110 is moving the mobile device 104 to the left after initiating a start indication 226, initiates a stop indication 228 but continues to move the mobile device 104 left, then initiates another start indication 226 prior to expiration of the data capture-stop delay 227 time period, then the annotation 112 will start to the left of stop indication 228 as opposed to resetting to the initial start point (e.g., initial start point 322 discussed below). If, however, the data capture-stop delay 227 time period has passed, then the annotation will restart at the initial start point. It should be appreciated that the data capture-stop delay 227 can be implemented in the host annotation software 308 discussed below in some embodiments.

Upon receipt of the start indication 226, the client annotation software 220 operates to capture data from the sensors within sensor group 210, and store the data as the sensor data 230. This data gathering may be repeated to form a plurality of time measurements of the sensor data 230. At each given time within the set of time measurements, one or more of a tilt 232 ($\gamma$, t), yaw 234 ($\alpha$, t), and roll 236 ($\beta$, t) of the mobile device 104 is calculated. In some embodiments, a translation 238 may also be calculated based on the data accelerometer 214, and calculations of the tilt 232, yaw 234, and roll 236 between two or more of the time measurements. One or more of the tilt 232, yaw 234, roll 236, and translation 238 data is then packaged and transmitted to the host device 106 as client annotation output 240. In embodiments, the client annotation output 240 includes, either in addition to or in place of the tilt 232, yaw 234, roll 236, and translation 238 data, a series of (x,y) screen coordinates representing the intended motion of the annotation 112 on the shared display 102 based on the sensor data 230. In embodiments that do not include the magnetometer 218 and/or sensor data gathered therefrom, the sensor data 230 need not be calibrated based on magnetic field data because the movement of the mobile device 104 is tracked at each of the plurality of time measurements, and this tracking begins when the start indication 226 is generated. Thus, the magnetic field data from the magnetometer 208 is not needed because the sensor data 230 is calculated based on the first of the time measurements.

In embodiments, the sensor data 230 may be limited by a sensor threshold 239. The sensor threshold 239 operates to set a maximum change in the sensor data allowed. For example, if the mobile device 106 is yawed, rolled, or tilted above a maximum value (as defined by the sensor threshold 239), then the client annotation software 240 may generate the client annotation output 240 indicating to reset the annotation to an initial start point (e.g., the initial start point 322 discussed below).

Figure 4:
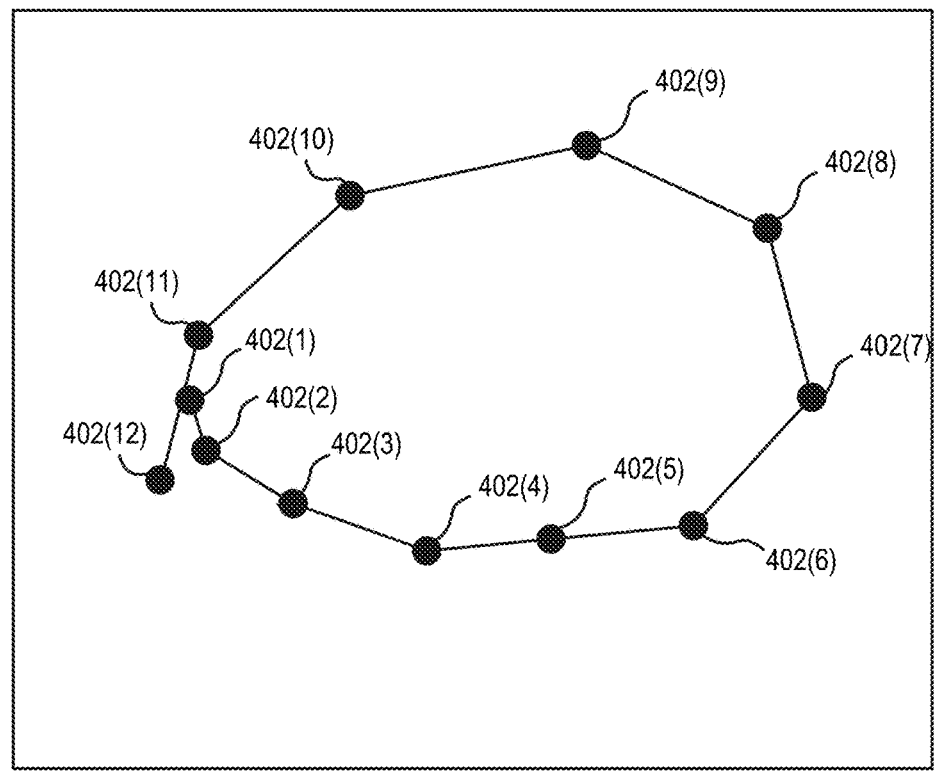
FIG. 4 depicts a plurality of control joints at each of twelve time measurements, in embodiments.

In embodiments, the client annotation output 240 is preprocessed by the client annotation software 220 prior to transmittal to the host device 106 to determine a plurality of control joints 242. The control joints 242 are a series of points representing the intended annotation at each of the given times within the set of time measurements. For example, the control joints 242 may represent the translation 238 from one time in the time of measurements to the next time in the time of measurements. FIG. 4 depicts a plurality of control joints 402 at each of twelve time measurements, in embodiments. Within FIG. 4, the length of the line 404 between each control joint 402 is defined by the translation between each bounding control joint 402. Furthermore, the vector direction of the line 404 is defined by one or more of the tilt, yaw, and roll from one control joint 402 to the next control joint 402.

Modifying Annotation Information

Figure 5:
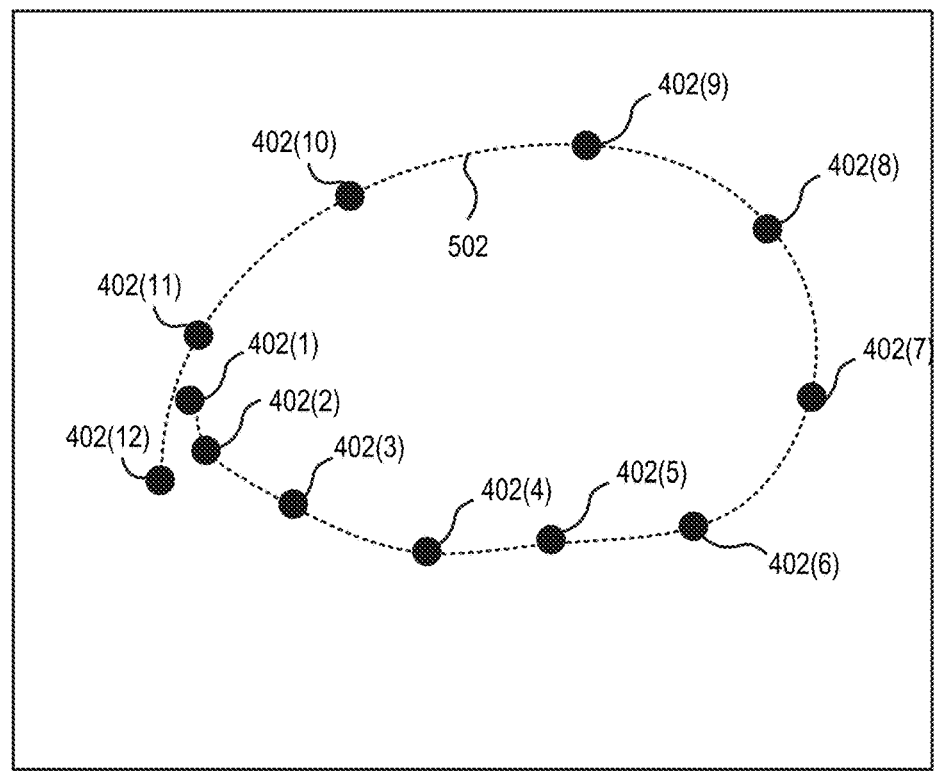
FIG. 5 depicts an example client annotation output after application of a predetermined modifier, in embodiments.

In embodiments, the client annotation output 240 is preprocessed by the client annotation software 220 prior to transmittal to the host device 106 to apply a predetermined modifier 244 to the plurality of control joints 242. The predetermined modifier 244 may, for example, include fitting a parameterized curve to the plurality of control joints 242 to smooth, or otherwise remove noise and jitter within a line defined by the control joints 242. The parameterized curve may be a polynomial curve or a spline curve. FIG. 5 depicts an example client annotation output 240 after application of a predetermined modifier 244.

Figure 6:
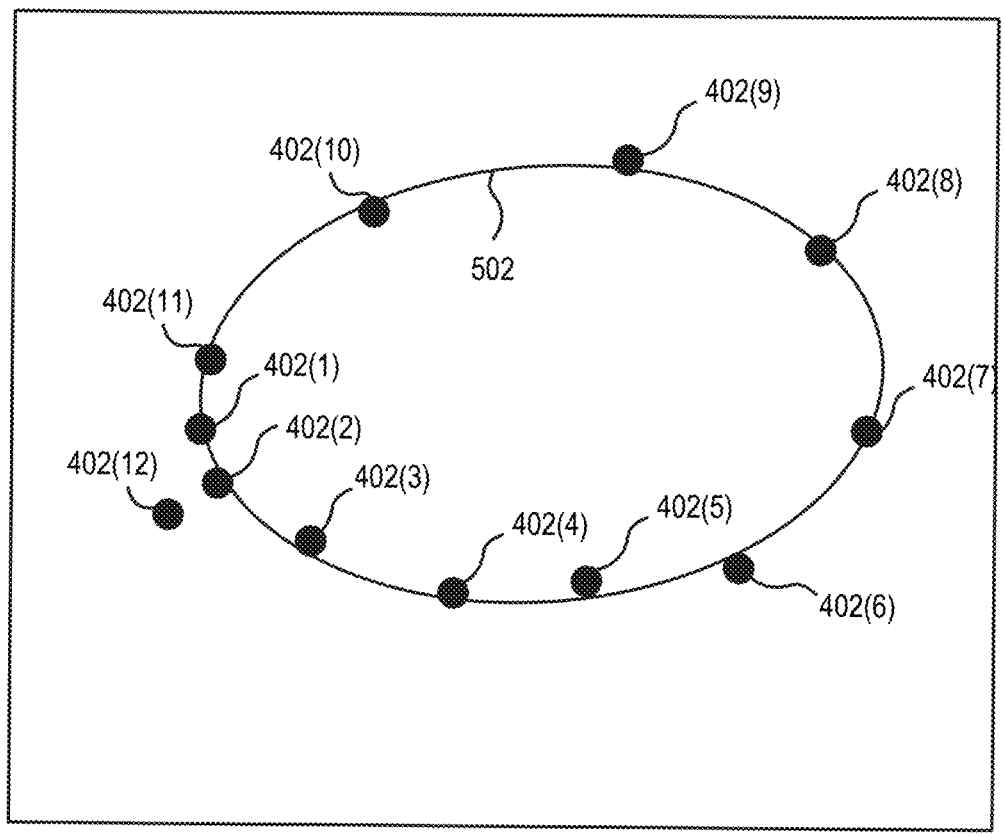
FIG. 6 depicts an example client annotation output in the form of a shape (oval) fit to the plurality of control joints.

In embodiments, the client annotation output 240 is preprocessed by the client annotation software 220 prior to transmittal to the host device 106 to fit a shape to either the plurality of control joints 242 or the parameterized curve or spline. For example, the control joints 242 are fit to a set of parametric functions using a fitting technique, such as but not limited to Least-Squares fitting, to derive a residual fit error to each of the different parametric function. If the fit is sufficient, the best fit curve is then sent as the client annotation output 240 (either alone or also with the control joints 242), else a spline may be fit to the control joints 242. Consider the example that user 110 "draws" an ellipse to the display using the mobile device 104—of course the raw control points 242 are jittery, and the user 110 may only draw an approximation of an ellipse. The control joints 242 are iteratively fit to each of a line (including any parametric function thereof), to a circle, to an ellipse, to a rectangle, etc. . . . the ellipse may have a low fit error and now it is understood that the user's intention was to actually draw an ellipse, so that is what gets rendered as the control output 240. FIG. 6 depicts an example client annotation output 240 in the form of a shape 602 (oval) fit to the plurality of control joints 402. It should be appreciated that one or more outlier control joints (e.g., control joint 402(12)) may be excluded from the shape fitting process.

In embodiments, prior to transmittal to the host device 106, the client annotation output 240 is pre-processed to include or be modified one or more of client input data 246. Client input data 246 includes inputs from the user 110 via the input device 206. The client input data 246 may include one or more of a color 248, size 250, shape 252, text 254, and animate indication 256. If client input data 246 is included, such as if a shape 252 is selected by the user 110, then the above predetermined modified 244 may not be necessary. For example, the user 110 may select a circle shape and the circle will be displayed as the annotation on the shared display device 102.

The animate indication 256 may be a press of an actual or virtual button (e.g., a double tap of the same button as the start indication 226), or may be a gesture (e.g., a push of the mobile device 104 forward in space). The animate indication 256 causes the annotation 112 on the shared display 102 to animate (e.g., via a water drop or other annotation such as a shaking motion, circle motion, etc.). This animation draws the audience's attention to the current location of the annotation, and underlying content.

In embodiments, the client annotation output 240 includes just the raw sensor data 230 (and other client input data 246) and the host device 106 may then perform a predetermined modifier. Moreover, it should be appreciated that any number of control joints 242 may be transmitted to the host device 106 at a given time. As such, the mobile device 104 will transmit periodically annotation updates including the current annotation output 240 and any additional control joints 242 (and modified data, or raw data 230).

The host device 106 may transmit an annotation acknowledgement 314 to the mobile device 104 verifying receipt of the client annotation output 240. The mobile device 104 may display the annotation acknowledgement 314 to the user 104 via the display 208 such that the user knows the annotation is being displayed on the shared display 102.

The mobile device may generate the client annotation output 240 continuously or periodically until identification of the stop indication 228. Thus, the annotation 112 on the shared display 102 is generated in real time based on the data from the mobile device 104.

The client annotation software 220 may, accordingly, be operated in a continuous annotation mode where the start indication 226 controls the annotation to always be active (e.g., "turned-on") until an affirmative stop indication 228 is received (such as press of a virtual or active button, or affirmative gesture performed). The client annotation software 220 may also be performed in an intermittent annotation mode where the stop indication 228 is just release of the same button on the mobile device 104 initiating the start indication 226. For example, the button 702 may be pressed (or otherwise moved up on the display of the mobile device 104) and the annotation 112 associated with that mobile device 104 is displayed until the button 702 is released (or otherwise moved down on the display).

Host Device Annotation Processing:

Upon receipt of the client annotation output 240, the host annotation software 308 may control the shared display 102 to display an annotation 316 thereon. The annotation 316 may include annotation content 318 and an associated user ID 222 identifying the mobile device 104 or the user 110 thereof. The associated user ID 222 may be a textual identification (e.g., the user 110 name), a color code, or a stylistic (e.g., specific pattern of dashed lines, etc.).

In embodiments, the annotation 318 may be displayed according to one or more annotation settings 320. The annotation settings 320 may include an annotation initial start point 322 which defines the start point for the annotation. For example, the start point 322 may be the center of the shared display 102. The start point 322 may also be a corner of the shared display 102, or any other point in relation thereto (including on- or off-screen of the shared display 102).

Furthermore, any of the above discussed processing of the sensor data 230 may be performed at the mobile device 104, or at the host device 106. For example, in embodiments where the client annotation output 240 includes either the raw sensor data 230, the un-modified control joints 242, and/or the client input data 246, the annotation settings 320 may include the predetermined modifier 244 such that the client annotation output 240 is pre-processed according to the predetermined modifier 244 in similar manner as discussed above prior to display as annotation 316 on the shared display 102.

Transient Annotations:

In embodiments, the annotation 316 may be transient in nature. Accordingly, the annotation settings 320 include an annotation timer 324 that defines how long the annotation 316 will be present on the shared display 102. In embodiments, the annotation timer 324 is a clock-based timer that keeps the annotation 316 on the shared display 102 for a predetermined period of time, which may be infinite as long as the shared display 102 is displaying the shared content 108. In embodiments, the annotation timer 324 is based on the length of the annotation 316 on the shared display. For example, the annotation 316 may fade or "trail" for only a predetermined length on the shared display 102. In embodiments, the length of the annotation 316 may be based on a speed of the annotation 316 as defined by the translation information 238, discussed above.

Furthermore, in embodiments, the annotation 316 may include a transition from a raw annotation data (such as direct display of the control joints 242), to a modified annotation data (e.g., display of the modified annotation data after application of the predetermined modifier 244). For example, annotation 316 on the shared display 102 may fade from the control joints 242 to the modified annotation. This allows the audience to visually understand that the annotation is being smoothed and/or fit to a curve/shape.

In embodiments, the host device 106 may further operate to alter the intended annotation based on a constraint of the shared display 102. For example, if the annotation 112 reaches an edge of the shared display 102, the annotation may be rendered only at the edge of the shared display 102 instead of going off-display. As soon subsequent the client annotation output 240 indicates to move the annotation 112 back away from the edge, the annotation is then rendered away from the edge. In embodiments, the subsequent annotation output 240 must be proportional to all other client annotation outputs 240 received. For example, if the annotation 112 reaches the edge of the shared display 112, and the annotation output 240 moves 10% farther than the edge, the subsequent client annotation outputs 240 must move proportional to the 10% back towards the edge before the annotation 112 is moved on the shared display 102. Alternatively, subsequent annotation output 240 just needs to move in a direction opposite the edge that the annotation 112 is rendered upon to go back "on-screen." For example, if the annotation 112 is rendered at the top edge because the client annotation output 240 controlled the annotation 112 until it went off-screen at the top edge, then as soon as subsequent annotations 240 indicate the user 110 is moving the mobile device 104 down, the annotation 112 is positioned away from the top edge.

Storing Annotations:

The host annotation software 308 may further keep an annotation history 326. The annotation history 326 may be all encompassing such that it includes all annotations 316 from all users 110. The annotation history 326 may be divided by user 110 such that a given user 110 may access their (or other user's 110) annotations 316 at a later date after presentation of the shared content 108. The annotation history 326 may be divided by natural breaks in the displayed content 108, such as by pages in a word document, pages in a PowerPoint, minutes in a presentation, etc. The annotation history 326 may then be transmitted to a remote device from the host device 106, such as a cloud server, so that the users 110, via the client annotation software 220 may access the annotations 316 at a later date.

Figure 8:
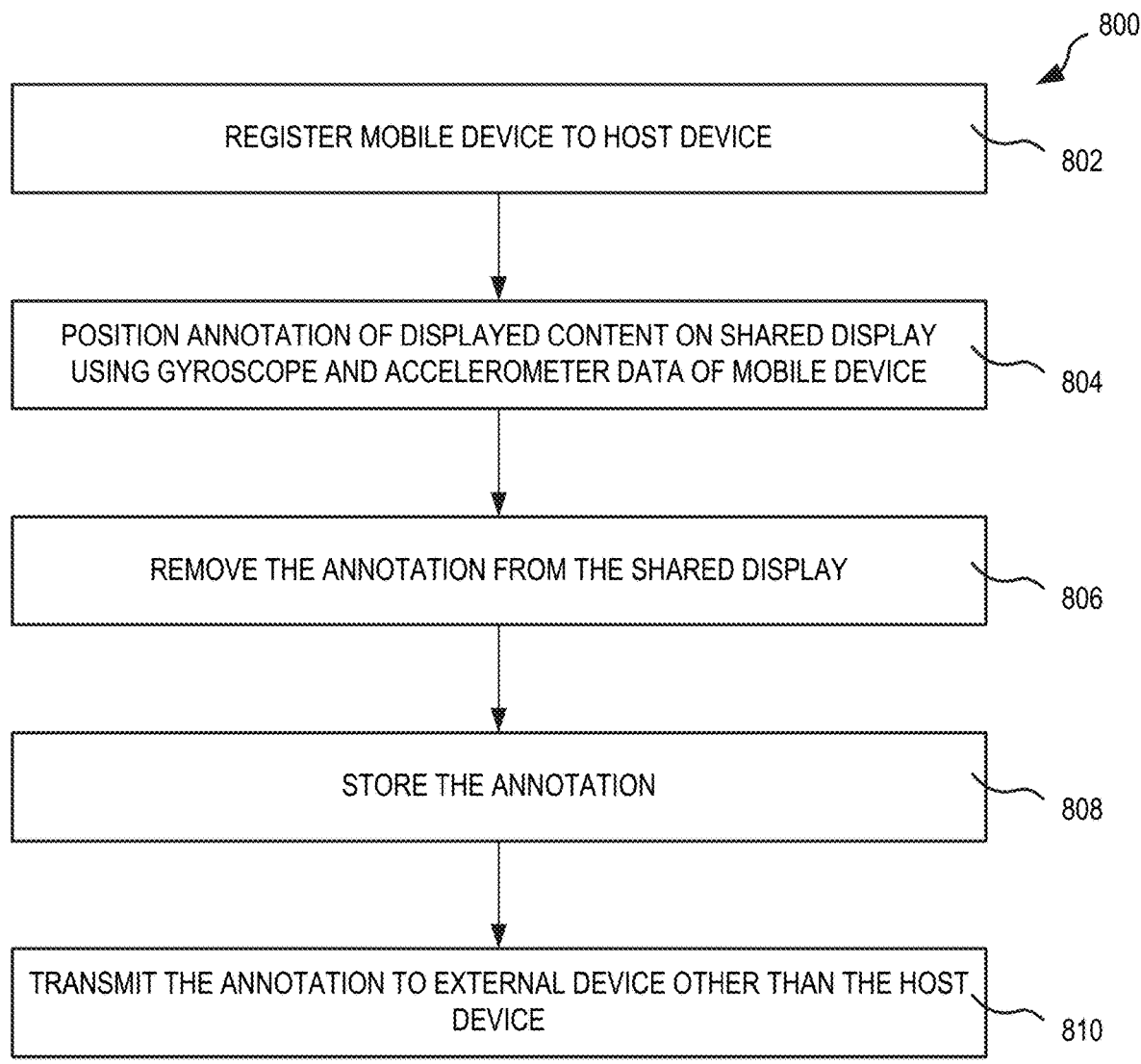
FIG. 8 is a flowchart for a method for annotation of a shared display using a mobile device, in embodiments.

FIG. 8 is a flowchart for a method 800 for annotation of a shared display using a mobile device, in embodiments. The method 800 is performed, for example, using system 100 discussed above with respect to FIGS. 1-7B.

In block 802, the method 800 registers a mobile device to a host device. In one example of block 802, the mobile device 104 is registered to the host device 106 and thus wirelessly connected together.

In block 804, the method 800 positions annotation of displayed content on a shared display using at least gyroscope and accelerometer data of the mobile device. In one example of block 804, the annotation 316 is positioned on the shared display 102 based on the sensor data 230 generated by the mobile device 104.

In block 806, the method 800 removes the annotation from the shared display. In one example of method 800, the host device 106 removes the client annotation 316 according to the annotation timer 324. Accordingly, in one example of block 806, the client annotation 316 is removed after a predetermined time period based on the annotation timer 324 being a clock-based annotation timer. Accordingly, in one example of block 806, the client annotation 316 is removed after a predetermined length of the annotation 316 as displayed on the shared display 102. Accordingly, in one example of block 806, the client annotation 316 is faded based on a speed of the annotation 316 on the shared display 102 as determined by translation information 238.

In block 808, the method 800 stores the annotation. In one example of block 808, the host device 106 stores the annotation 316 in the memory 306 as annotation history 326. In examples of block 808, the annotation history 326 may be divided by user 110 such that a given user 110 may access their (or other user's 110) annotations 316 at a later date after presentation of the shared content 108. In examples of block 808, the annotation history 326 may be divided by natural breaks in the displayed content 108, such as by pages in a word document, pages in a PowerPoint, minutes in a presentation, etc.

In block 810, the method 800 transmits the stored annotation to an external device. In one example of block 810, the annotation history 326 is transmitted directly to the mobile device 104. In examples of block 810, the annotation history 326 is transmitted to an external device, such as cloud storage, and the external device makes the annotation history available for access by the mobile device 104.

Figure 9:
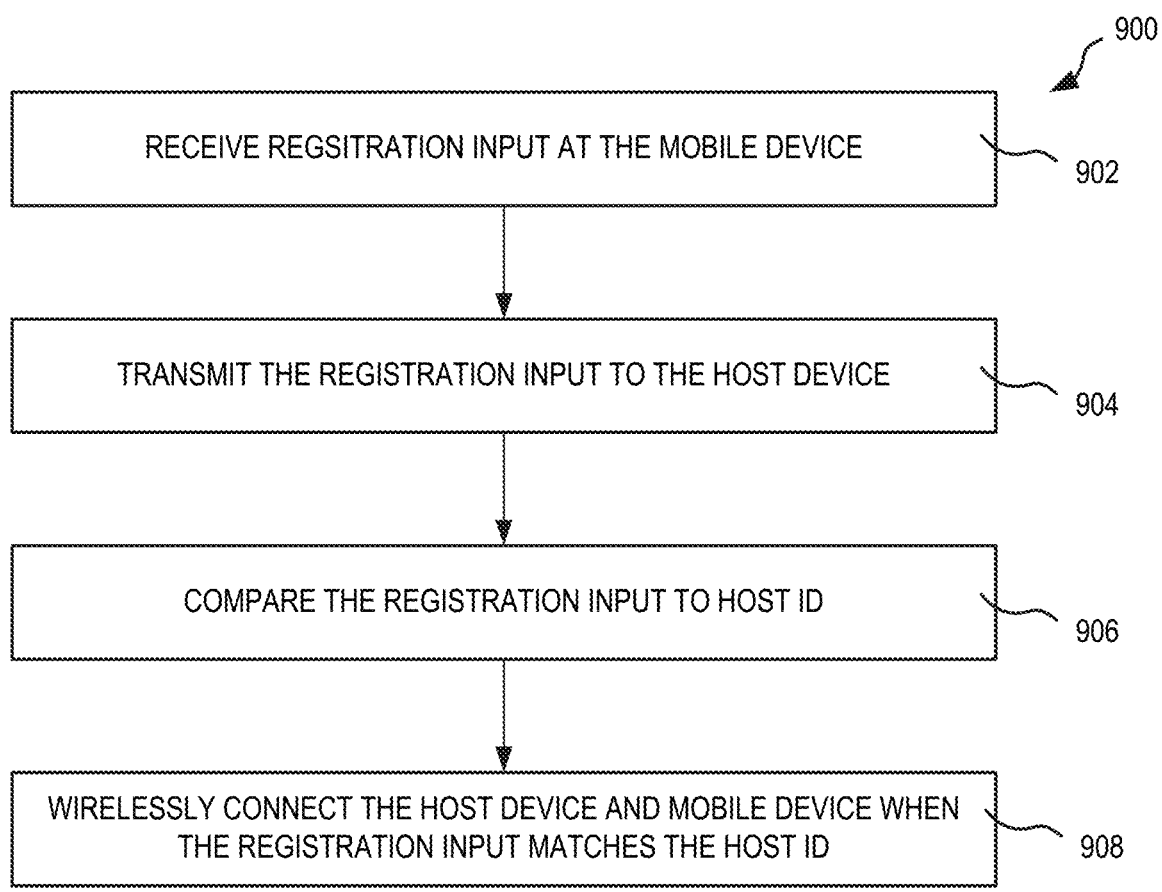
FIG. 9 depicts an example method for registering a mobile device to a host device, in embodiments.

FIG. 9 depicts an example method 900 for registering a mobile device to a host device, in embodiments. The method 900 is an example of the block 802 of method 800.

In block 902, the method 900 receives a registration input at the mobile device. In one example of block 902, the user 110 inputs the registration input 224 using the input device 206. In one example of block 902, the registration input 224 is automatically generated based on proximity of the mobile device 104 to the host device 106.

In block 904, the method 900 transmits the registration input to a host device. In one example of block 904, the registration input 224 is transmitted to the host device 106 from the mobile device 104.

In block 906, the registration input is compared to a host ID. In one example of block 906, the registration input 226 is compared by the host annotation software 308 to the host ID 310.

In block 908, the mobile device and the host device are wirelessly connected when the registration input matches the host ID in block 906. In one example of block 908, the mobile device 104 is wirelessly connected to the host device 106.

Figure 10:
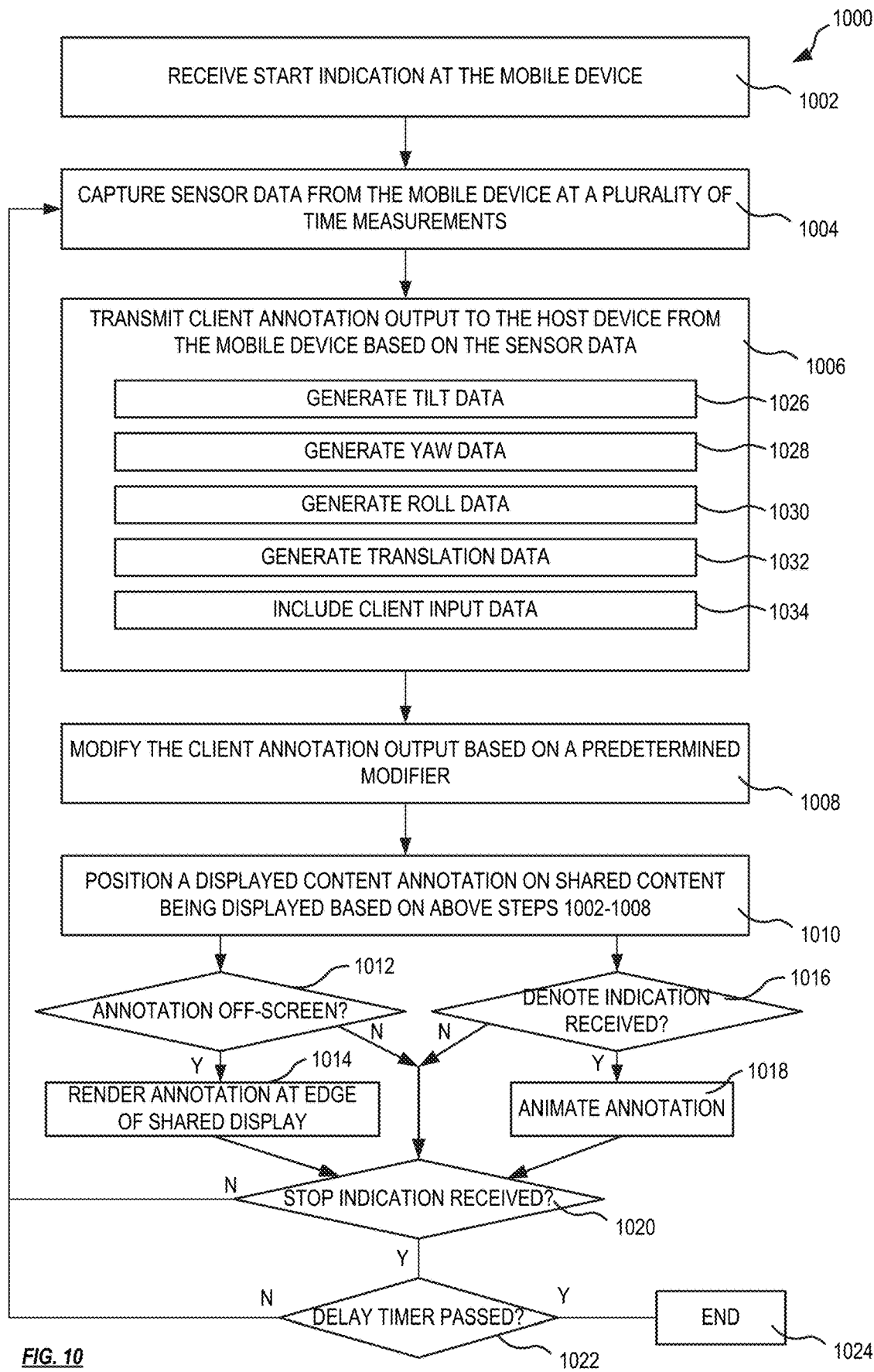
FIG. 10 depicts an example method for positioning an annotation of displayed content on a shared display, in an embodiment.

FIG. 10 depicts an example method 1000 for positioning an annotation of displayed content on a shared display, in an embodiment. Method 1000 is an example of block 804 of method 800.

In block 1002, the method 1000 receives a start indication at the mobile device. In one example of block 1002, the mobile device 104 receives the start indication 226. The start indication 226 may be a press of an actual or virtual button on the input device 206, or other action such as a "swipe up" motion indicated in FIGS. 7A-7B. The start indication 226 may be determination of a specific gesture performed by the user 110 with the mobile device 104, such as flipping the phone over from screen-down to screen-up.

In block 1004, the method 1000 captures sensor data from the mobile device at a plurality of time measurements. In one example of block 1004, the sensor data 230 is captured from the respective sensors in the sensor group 210 at each of a plurality of time measurements.

In block 1006, a client annotation output is transmitted to the host device from the mobile device based on the sensor data. In one example of block 1006, the client annotation output 240 is transmitted to the host device 106 from the mobile device 104. Block 1006 may include one or more sub-blocks. In sub-block 1026, the method 1000 generates tilt data. In one example of sub-block 1026, the tilt data 232 is generated and included in the client annotation output 240. In sub-block 1028, the method 1000 generates yaw data. In one example of sub-block 1028, the yaw data 324 is generated and included in the client annotation output 240. In sub-block 1030, the method 1000 generates roll data. In one example of sub-block 1030, the roll data 236 is generated and included in the client annotation output 240. In sub-block 1032, the method 1000 generates translation data between two of each of the time measurements. In one example of sub-block 1032, the translation data 238 is generated and included in the client annotation output 240. In sub-block 1034, the method 1000 includes client input data. In one example of sub-block 1034, the client input data 246 is included in the client annotation output 240.

In block 1008, the client annotation output is modified based on a predetermined modifier. In one example of block 1008, the client annotation software 220 applies the predetermined modifier 244 prior to transmission of the client annotation output 240 to the host device 106 in block 1006. In one example of block 1008, the host annotation software 308 applies the predetermined modifier 244 after receipt of the client annotation output 240 from the mobile device 104 in block 1006. In examples of block 1008, either the client annotation software 220 or the host annotation software 308 identifies the plurality of control joints 242 and applies to the predetermined modifier 244 thereto. The predetermined modifier 244 may, for example, include fitting a parameterized curve to the plurality of control joints 242 to smooth, or otherwise remove noise and jitter within a line defined by the control joints 242. The parameterized curve may be a polynomial curve or a spline curve.

In block 1010, a displayed content annotation is displayed on shared content displayed on a shared display based on above steps 1002-1008. In one example of block 1010, the host device 106 transmits the annotation 316 for display on the shared display 102 overlaid on the shared content 108.

Method 1000 then initiates one or more decision steps to determine continued display of the annotation. For example, block 1012 is a decision. In block 1012, method 1000 determines if the annotation displayed on the shared display is positioned by the mobile device off-screen. If yes, then method 1000 proceeds to block 1014, else, method proceeds with block 1020. In block 1014, the method renders the annotation at an edge of the shared display that the mobile device positioned the annotation off of. In one example of operation, the host device 106 generates the annotation 316 indicating to position the annotation 112 on the shared display 102 at an edge. The annotation 112 may stay at the edge until method 1000 receives further client annotation output (e.g., at block 1006) that indicates to position the annotation away from the edge.

Block 1016 is another decision that may occur simultaneously with, before, or after either of block 1012 and block 1020. In block 1016, the method determines if an animate indication is received from the mobile device. If yes, then method 1000 proceeds with block 1018, else method 1000 proceeds with block 1020. In one example of operation of block 1016, the client annotation output 240 includes the animate indication 256. In block 1018, the method 1000 animates the annotation on the shared display. In one example of block 1018, the annotation 112 is animated to flash, shake, circle, display a watermark, or other animation on the shared display 102.

Block 1020 is a decision. In block 1020, method 1000 determines if a stop indication has been received. If no, then the method 1000 repeats step 1004, else, method 1000 proceeds with block 1022. In one example of block 1020, the mobile device 104 receives the stop indication 228. The start indication 228 may be a press of an actual or virtual button on the input device 206, or other action such as a "swipe down" motion. The stop indication 228 may be determination of a specific gesture performed by the user 110 with the mobile device 104, such as flipping the phone over from screen-up to screen-down.

Block 1022 is a decision. In block 1022, method 1000 determines if a capture-stop delay timer has passed. If so, then method ends at block 1024 which may repeat block 1002. Else, method 1000 repeats block 1004 and begins displaying the annotation if another start indication is received prior to passing of the capture-stop delay timer passing. In one example of block 1022, it is determined if the capture-stop delay 227 time has passed.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for annotation of a shared display, comprising:
   a host device coupled with the shared display and including a processor and memory storing host annotation instructions that when executed by the processor operate to:
   transmit a host ID to the shared display for display thereon,
   transmit displayed content to the shared display for display thereon,
   wirelessly connect the host device with a mobile device in response to determination that a registration input, received from the mobile device, matches the host ID,
   in response to receipt of a start indication from the mobile device, position a displayed content annotation based on client annotation output received from the mobile device, the client annotation output being based on sensor data from position sensors of the mobile device,
   wherein the position the displayed content annotation includes modifying the client annotation data based on a predetermined modifier, the predetermined modifier being a polynomial curve or a spline curve fit to a plurality of control joints based on the client annotation output.

2. The system of claim 1, the position sensors being a gyroscope and accelerometer of the mobile device.

3. The system of claim 1, the host annotation instructions, when executed by the processor further operate to receive shared content from the mobile device, the annotation being an annotation over the shared content.

4. The system of claim 1, wherein the position the displayed content annotation includes initiating the annotation on the shared display at a preset annotation initial start point.

5. The system of claim 4, wherein the position the displayed content annotation includes resetting the displayed content annotation to the preset annotation initial start point when the client annotation output reflects that the sensor data has exceeded a sensor threshold.

6. The system of claim 4, the preset annotation initial start point being a center of the shared display.

7. The system of claim 1, the displayed content annotation including annotation content to be superimposed on the displayed content, and a client ID defining a user of the mobile device.

8. The system of claim 1, wherein the position the displayed content annotation includes rendering the displayed content annotation on the edge of the shared display when the client annotation output indicates to move the displayed content annotation off-screen.

9. The system of claim 1, wherein the position the displayed content annotation includes animating the displayed content annotation when the client annotation output includes an animate indication.

10. The system of claim 1, wherein the position the displayed content annotation includes removing the displayed content annotation from the shared display based on a preset annotation timer.

11. The system of claim 10, the preset annotation timer being a clock-based timer.

12. The system of claim 10, the present annotation timer defining a maximum length of the displayed content annotation on the shared display.

13. The system of claim 10, the present annotation timer being based on a speed of the displayed content annotation as defined by a translation included in the client annotation data.

14. The system of claim 1, the host annotation instructions, when executed by the processor, further operating to store annotation history defining prior annotations on the displayed content.

15. The system of claim 14, the host annotation instructions, when executed by the processor, further operating to transmit the annotation history to an external device.

16. A system for annotation of a shared display, comprising:
a host device coupled with the shared display and including a processor and memory storing host annotation instructions that when executed by the processor operate to:
transmit a host ID to the shared display for display thereon,
transmit displayed content to the shared display for display thereon,
wirelessly connect the host device with a mobile device in response to determination that a registration input, received from the mobile device, matches the host ID,
in response to receipt of a start indication from the mobile device, position a displayed content annotation based on client annotation output received from the mobile device, the client annotation output being based on sensor data from position sensors of the mobile device,
wherein the position the displayed annotation content includes modifying the client annotation data based on a predetermined modifier, the predetermined modifier being a shape fit to a plurality of control joints based on the client annotation output when the control joints fits the shape within a predefined fit threshold.

17. The system of claim 16, wherein the position the displayed content annotation includes removing the displayed annotation from the shared display based on a preset annotation timer.

18. The system of claim 17, the present annotation timer defining a maximum length of the displayed content annotation on the shared display.

19. A system for annotation of a shared display, comprising:
a host device coupled with the shared display and including a processor and memory storing a host annotation instructions that when executed by the processor operate to:
transmit a host ID to the shared display for display thereon,
transmit displayed content to the shared display for display thereon,
wirelessly connect the host device with a mobile device in response to determination that a registration input, received from the mobile device, matches the host ID,
in response to receipt of a start indication from the mobile device, position a displayed content annotation based on client annotation output received from the mobile device, the client annotation output being based on sensor data from position sensors of the mobile device,
wherein the position the displayed content annotation includes removing the displayed annotation from the shared display based on a preset annotation timer, the present annotation timer defining a maximum length of the displayed content annotation on the shared display.

20. A system for annotation of a shared display, comprising:
a host device coupled with the shared display and including a processor and memory storing a host annotation instructions that when executed by the processor operate to:
transmit a host ID to the shared display for display thereon,
transmit displayed content to the shared display for display thereon,
wirelessly connect the host device with a mobile device in response to determination that a registration input, received from the mobile device, matches the host ID,
in response to receipt of a start indication from the mobile device, position a displayed content annotation based on client annotation output received from the mobile device, the client annotation output being based on sensor data from position sensors of the mobile device,
wherein the position the displayed content annotation includes removing the displayed annotation from the shared display based on a preset annotation timer, the present annotation timer being based on a speed of the displayed content annotation as defined by a translation included in the client annotation data.

\* \* \* \* \*